(12) United States Patent
Jo

(10) Patent No.: US 7,073,088 B2
(45) Date of Patent: Jul. 4, 2006

(54) DATA BUS ARRANGEMENT AND CONTROL METHOD FOR EFFICIENTLY COMPENSATING FOR FAULTY SIGNAL LINES

(75) Inventor: Young-Soo Jo, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 10/293,355

(22) Filed: Nov. 14, 2002

(65) Prior Publication Data

US 2003/0101384 A1 May 29, 2003

(30) Foreign Application Priority Data

Nov. 29, 2001 (KR) .............................. 2001-75072

(51) Int. Cl.
*G06F 11/00* (2006.01)

(52) U.S. Cl. ........................................ 714/5; 710/305
(58) Field of Classification Search ................... None
See application file for complete search history.

(56) References Cited

U.S. PATENT DOCUMENTS

| 5,666,480 | A | * | 9/1997 | Leung et al. ................... 714/1 |
| 5,864,656 | A | | 1/1999 | Park |
| 5,905,875 | A | * | 5/1999 | Takahashi et al. .......... 710/300 |
| 6,034,995 | A | * | 3/2000 | Eisele et al. ................. 375/257 |
| 6,182,248 | B1 | | 1/2001 | Armstrong et al. |
| 6,298,376 | B1 | | 10/2001 | Rosner et al. |
| 6,311,296 | B1 | | 10/2001 | Congdon |
| 6,345,332 | B1 | | 2/2002 | Okazaki |
| 6,349,370 | B1 | | 2/2002 | Imamura |
| 6,434,703 | B1 | | 8/2002 | Parrish et al. |
| 6,449,729 | B1 | * | 9/2002 | Sanders et al. ................. 714/4 |
| 6,633,996 | B1 | * | 10/2003 | Suffin et al. .................... 714/4 |
| 6,871,294 | B1 | * | 3/2005 | Phelps et al. ................... 714/5 |
| 2002/0099980 | A1 | | 7/2002 | Olarig |
| 2004/0136319 | A1 | * | 7/2004 | Becker et al. .............. 370/225 |
| 2004/0260983 | A1 | * | 12/2004 | Leung et al. ................. 714/48 |

FOREIGN PATENT DOCUMENTS

| JP | 2000 222294 | * | 8/2000 |
| WO | WO 98-44417 | | 10/1998 |

OTHER PUBLICATIONS

Partial English language translation of JP2000-222294 (*accompanied by the Certificate of Translation*).
Computerized English language translation of JP2000-222294 (*abstract, claims and detailed description*), available at Japanese Patent Office website.

* cited by examiner

*Primary Examiner*—Scott Baderman
*Assistant Examiner*—Joshua Lohn
(74) *Attorney, Agent, or Firm*—Robert E. Bushnell, Esq.

(57) ABSTRACT

The present invention discloses a data bus connecting individual modules and carrying data there between. The data bus includes primary signal lines and supplementary signal lines. A master module having a bus monitor and a microprocessor detects for faulty signal lines and substitutes supplementary signal lines for faulty primary signal lines enabling the bus to continue carrying data between modules connected thereto. The status of the signal lines are communicated to all the other modules on the bus by a special signal line on the bus so that each module is informed of the substitution.

25 Claims, 4 Drawing Sheets

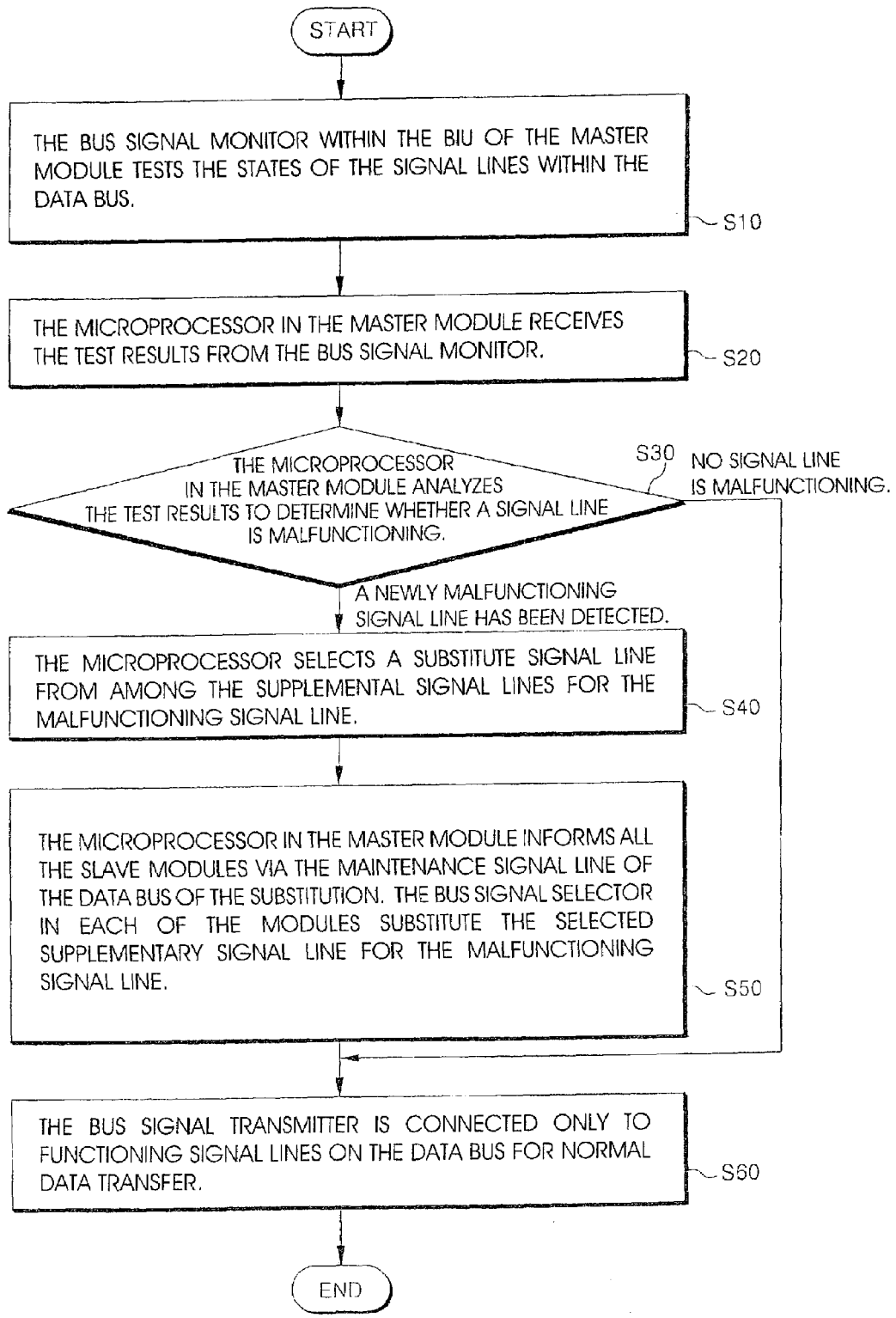

DATA BUS ARRANGEMENT AND CONTROL METHOD FOR EFFICIENTLY COMPENSATING FOR FAULTY SIGNAL LINES

CLAIM OF PRIORITY

This application claims priority under 35 U.S.C. § 119 to my application entitled "DATA BUS SYSTEM AND METHOD FOR CONTROLLING THE SAME", filed in the Korean Industrial Property Office on 29 Nov. 2001 and assigned Serial No. 2001-75072, the contents of which are hereby incorporated by reference.

BACKGROUND OF THE INVENTION

1. Field of the Invention

The present invention relates to a data bus system, and more particularly to a data bus having only a single bus having extra signal lines that are used to compensate for faulty, malfunctioning signal lines.

2. Description of the Related Art

In a data bus system using a single data bus having a plurality of signal lines, when one or more signal lines among the plurality of signal lines malfunction, the data bus ordinarily cannot function properly.

U.S. Patent Application No. 2002/0099980 A1 to Olarig seeks to overcome such a problem when a 64 bit bus is being used. In Olarig '980, the 64 bit bus is composed of a 32 bit upper bus and a 32 bit lower bus. If there are no malfunctioning signal lines, the entire 64 bit bus is used to transmit data. If at least one signal line on the upper 32 bit bus has a parity error, data is then transmitted only via the lower 32 bit bus. If at least one signal line on the lower 32 bit bus has a parity error, data is then transmitted only via the upper 32 bit bus.

However, a major drawback of the Olarig '980 system is that if there is a single faulty signal line in both of the upper and the lower 32 bit busses that make up the 64 bit bus, the entire 64 bit bus cannot be used to transmit data. Thus, by just having two erroneous signal lines on the 64 bit bus of Olarig '980 can render the entire 64 bit bus in Olarig '980 unusable. This is inefficient. Another drawback of the Olarig '980 system is that a single faulty signal line in Olarig '980 disables 32 signal lines, forcing data to be transmitted on a 32 bit bus instead of a 64 bit bus. This too is inefficient.

I have not seen a data bus method or apparatus that disables only individual faulty signal lines and substitutes extra supplemental signal lines for the faulty signal lines to enable data transmission on a data bus having one or more faulty signal lines. Therefore, what is needed is a more efficient data bus arrangement that can efficiently compensate for faulty signal lines without consuming enormous resources.

SUMMARY OF THE INVENTION

It is therefore an object of the present invention to provide an improved method and apparatus for compensating for malfunctioning and faulty signal lines on a data bus.

It is also an object of the present invention to provide a more efficient method and apparatus for compensating for faulty or malfunctioning signal lines on a data bus in such a way so that enormous or unnecessary resources are not allocated for such a data bus.

It is further an object of the present invention to provide a method and apparatus for detecting individual faulty signal lines on a data bus and substituting individual functional supplementary signal lines for the faulty signal lines on the data bus so that data can continue to be transmitted over the data bus despite the presence of faulty signal lines.

It is yet another object of the present invention to have a maintenance signal line on the data bus that is used to identify which signal lines are faulty and which signal lines are being substituted for the faulty signal lines to each module connected to the data bus.

It is still yet another object of the present invention to have a plurality of modules, each having bus interface units (BIU) connected to the novel data bus to send and receive data to and from the novel data bus.

It is yet further an object of the present invention to have one of the plurality of modules being a master module and the remaining modules being slave modules, the master module communicates which signal lines are carrying data and which signal lines are faulty by using the maintenance signal line.

It is yet another object of the present invention to have the novel data bus and the modules part of an asynchronous transfer mode (ATM) cell.

These and other objects may be achieved by providing a data bus system having a single data bus including a plurality of primary signal lines and a plurality of supplemental signal lines and a maintenance signal line. In the absence of faulty signal lines, only the primary signal lines are used to transmit data. Upon detection of one or more faulty signal lines among the primary signal lines, the faulty signal lines are no longer used to transmit data. Instead, supplemental signal lines are substituted for the faulty signal lines and the data bus can continue to transmit data using the same data bus and using the same number of signal lines. For example, if it is detected that three of the primary signal lines are faulty, three supplemental signal lines are selected to be substituted for the three faulty primary signal lines and the remaining working primary signal lines along with the three selected supplemental signal lines are used to transmit data. The three faulty primary signal lines along with supplemental signal lines that have not been selected remain idle. The maintenance signal line carries information regarding which primary signal lines are faulty and which supplemental signal lines have been selected to transmit data in place of the faulty primary signal lines.

The above-aforementioned bus arrangement can be applied to an ATM cell. In such a scenario, a plurality of modules are connected to the data bus. Only one of the modules is the master module and the other modules are designated as slave modules. Each module has a BUI. The master module has a bus signal monitor that serves to test and detect when a signal line on the bus becomes faulty, to identify the faulty signal line and inform a microprocessor of the master module of the signal line that has become faulty. The microprocessor then selects one of a plurality of supplemental signal lines that is to be used in place of the faulty signal line. Then the microprocessor informs each module of the erroneous signal line and the selected supplemental signal line. In each module, a bus signal selector is then connected to the corresponding signal lines that are used to transmit or carry data. A bus signal transmitter in each module is then directly connected to the bus signal selector for transmitting data to the bus. The bus is continually monitored by the bus signal monitor and a set of working signal lines are routinely updated as signal lines become faulty.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a flow chart illustrating an operation of the data bus system in an ATM cell according to the principles of the present invention.

DETAILED DESCRIPTION OF THE INVENTION

Figure 1:
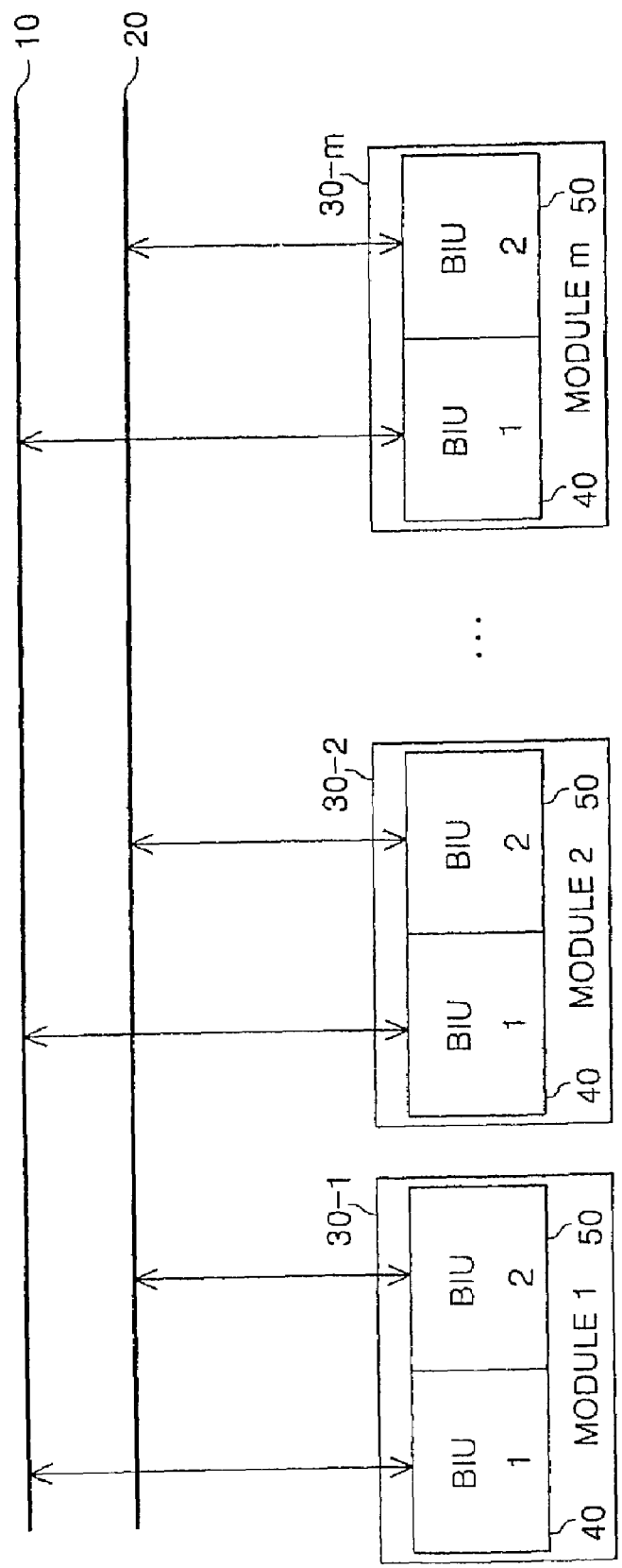
FIG. 1 is a schematic diagram of a data bus system in an asynchronous transfer mode ATM cell using a dual data bus.

One solution in overcoming the problem of the possible occurrence of faulty signal lines is to provide two busses to carry data. Each bus includes a plurality of signal lines. FIG. 1 illustrates such an arrangement where two busses are present in an asynchronous transfer mode ATM cell. Connected to both busses 10 and 20 are m modules, each having a BIU. Data bus 10 is called a primary data bus and data bus 20 is called a substitute data bus. In the absence of faulty signal lines, primary bus 10 only is used to carry data while substitute bus 20 remains idle. Upon detection of a faulty signal line in primary data bus 10, substitute bus 20 is then used to carry data while primary bus 10 remains idle.

In order for such an arrangement to work in an ATM cell, each of the m modules 30-1 through 30-m must have 2 BIU's, a first BIU 40 connected to primary bus 10 and the second BIU 50 connected to substitute bus 20. Thus, when primary bus 10 is carrying data, each BIU 40 in each module 30-1 through 30-m are used while each BIU 50 in each module 30-1 through 30-m are left idle. When a faulty signal line is detected on the primary bus 10 and the substitute bus 20 is used to carry data, each BIU 40 in each module 30-1 through 30-m are left idle while each BIU 50 in each module 30-1 through 30-m are used in the data transmission process.

Like the reference to Olarig '980, the solution posed in FIG. 1 has the following drawbacks. FIG. 1 requires an enormous amount of redundant circuitry. As a result, at any given time, m BIU's and an entire bus are left idle. This extra circuitry adds to manufacturing cost and is therefore not a very desirable solution in compensating for a faulty signal line.

Even worse, in the arrangement of FIG. 1, if a faulty signal line is present in both the primary bus 10 and the substitute bus 20, data can no longer be transmitted. Therefore, it is desirable to have an arrangement for an ATM switch that both is less expensive to manufacture by having fewer redundant parts and is more resilient by compensating for the scenario when a plurality of signal lines go faulty.

Figure 2:
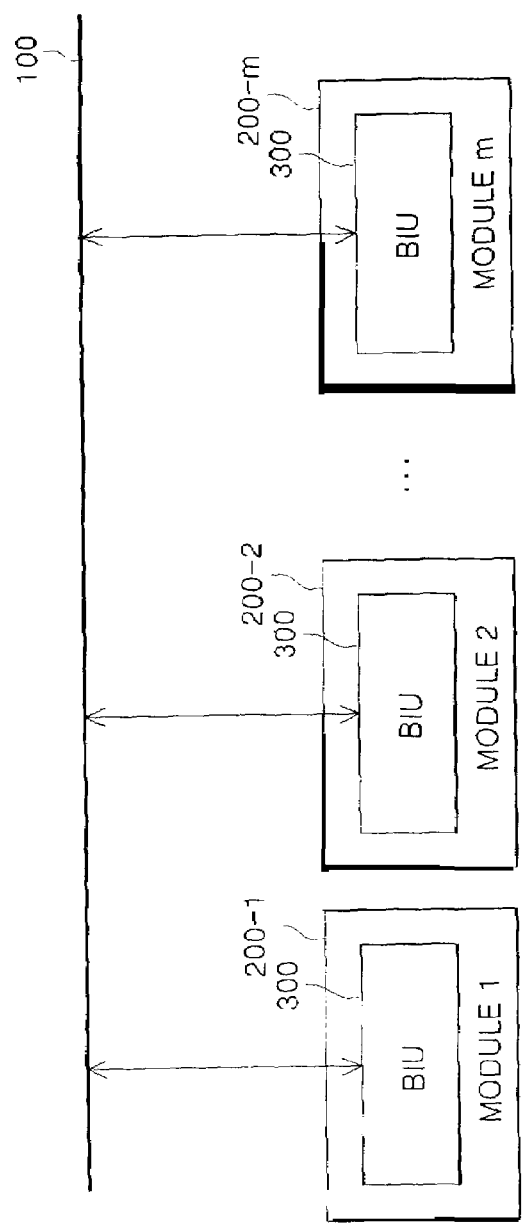
FIG. 2 is a schematic diagram of a data bus system in an ATM cell according to the principles of the present invention.

Referring to FIG. 2, a data bus system in an ATM cell according to the principles of the present invention is illustrated. Unlike FIG. 1, FIG. 2 has only a single bus 100. Furthermore, although m modules 200-1 through 200-m are present in FIG. 2, each module has only a single BIU 300 because only a single bus 100 is present. Therefore, unlike the arrangement of FIG. 1, FIG. 2 eliminates the need for a second bus, a second set of BIU's and a second set of electrical connections made from a second set of BIU's to a second bus. FIG. 2 achieves the goal of compensating for faulty signal lines on the bus without all the redundant electrical circuitry that adds greatly to manufacturing costs.

Figure 3:
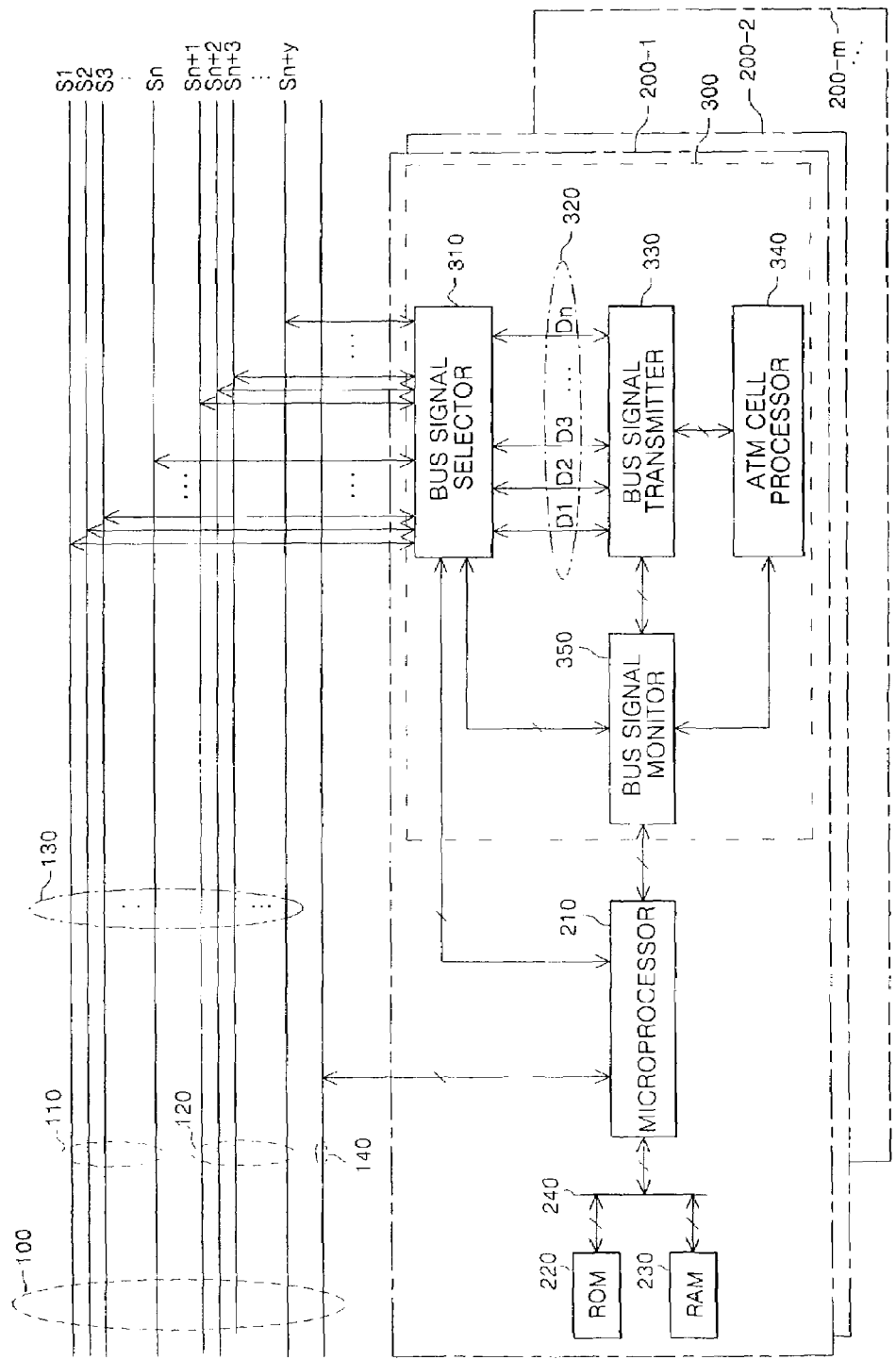
FIG. 3 is a diagram illustrating a master module attached to the data bus in accordance with the principles of the present invention.

In FIG. 2, only one of the modules 200-1 through 200-m is a master module and the remaining modules are slave modules. FIG. 3 is a detailed block diagram of FIG. 2. In FIG. 3, module 200-1 is assumed to be the master module and modules 200-2 through 200-m are slave modules. FIG. 3 illustrates all of the circuit components of master module 200-1 in detail along with the detailed construction of bus 100.

Turning to FIG. 3, bus 100 includes a plurality of (n) primary signal lines 110 ($S_1$ through $S_n$), a plurality (y) supplemental (or extra) signal lines 120 ($S_{n+1}$~$S_{n+y}$) and a maintenance signal line 140. When there are no faulty signal lines, primary signal lines 110 only carry data on bus 100 and all the supplemental signal lines 120 are left idle. When one or more of the primary signal lines are tested to be faulty, a corresponding number of selected supplemental signal lines 120 are used in substitution for the faulty primary signal lines. Therefore, the faulty primary signal lines and non-selected supplemental signal lines are idle while the non-faulty primary signal lines and the selected supplemental signal lines are used to carry data. It is to be appreciated that maintenance signal line 140 is used only to inform other modules which signal lines on bus 100 are being used to carry data, which signal lines on bus 100 are faulty and which signal lines on bus 100 are currently idle.

Exactly how the components of FIG. 3 achieve the above results will now be explained. In FIG. 3, master module 200-1 includes a bus interface unit (BIU) 300. BIU 300 includes a bus signal monitor 350 and a bus signal selector 310. Bus signal selector 310 in master module 200-1 is directly connected to all of the signal lines on bus 10 with the exception of maintenance signal line 140. Bus signal monitor 350 is used to test for errors, faults and for malfunctioning signal lines. When bus signal monitor 350 detects a faulty signal line, bus signal monitor 350 informs a microprocessor 210 in module 200-1 that a signal line has been found to be faulty and identifies for the microprocessor 210 which signal line is faulty. Then, microprocessor 210 selects which one of the supplemental signal lines $S_{n+1}$ through $S_{n+y}$ is to be used as a substitute for the faulty signal line. After the microprocessor 210 makes this selection, microprocessor 210 places information regarding which signal lines are faulty, which signal lines carry data and which signal lines are idle on to the maintenance signal line 140 of bus 100 to inform the other modules 200-2 through 200-m. In addition, microprocessor 210 informs bus signal selector 310 which signal lines are faulty, which signal lines are carrying data and which signal lines are idle. Bus signal selector 310 connects the signal lines that are now carrying data to bus signal transmitter 330 to enable sending and receipt of data over bus 100. Reference number 240 is a process bus that serves to connect microprocessor 210 to ROM 220 and RAM 230. Reference number 320 are signal lines of bus signal transmitter 330.

BUI 300 further comprises ATM cell processor 340 that performs signal processing of an ATM cell stream to the data transmitted from the bus signal transmitter 330 and retransmits the data to the bus signal transmitter 330. Master module 200-1 further includes a read only memory ROM 220 for storing a program necessary for an initial state and operations of the master module and a random access memory RAM 230 used as a temporary data memory for operating the master module.

Slave modules 200-2 through 200-m are constructed similar to master module 200-1 with the following exceptions. Often, slave modules are absent ROM 220, RAM 230 and microprocessor 210. Furthermore, the bus signal selector 310 in slave modules 200-2 through 200-m may be connected to maintenance signal line 140. This enables the microprocessor 210 of the master module 200-1 to inform the bus signal selectors 310 in each of the slave modules 200-2 through 200-m which signal lines on bus 100 are actively carrying data, which signal lines are faulty and which signal lines are idle. It is to be appreciated that the scope of this invention is not to be limited to a particular design for slave modules 200-2 through 200-m as the composition of the slave modules 200-2 through 200-m may vary, for example, to include a microprocessor and memory.

A description of the method for operating the novel bus 100 and ATM cell illustrated in FIGS. 2 and 3 will now be made with reference to the flow chart of FIG. 4. At first, the bus signal monitor 350 within the BIU 300 of the master module 200-1 tests the functionality of each signal line within the data bus 100 in step S10. Then, the bus signal monitor 350 in BIU 300 of master module 200-1 delivers the test results to the microprocessor 210 of the master module 200-1 in step S20 for an analysis of the test results and to take further action if necessary. In step S30, if the test results show that one or more previously functioning signal lines on bus 100 have started to malfunction, the control passes to step S40 where further action is required of the microprocessor 210 of master module 200-1. If the test results indicate that there is no change in the functional state of the signal lines in bus 100 since the last time they were tested, the control in step S30 passes to step S60 and no further action need be taken at this time by microprocessor 210 of master module 200-1.

In step S40, the microprocessor 210 of the master module 200-1 selects and substitutes supplementary signal lines for corresponding newly discovered faulty signal lines. For example, when the n$^{th}$ signal line (S$_n$) is determined to have become faulty, the microprocessor 210 selects one of the supplementary signal lines 120, for example signal line S$_{n+y}$ to carry data in substitute for faulty primary signal line S$_n$ in step S40

After selecting substitute supplementary signal lines for newly discovered faulty primary signal lines, the microprocessor 210 of the master module 200-1 places information onto maintenance signal line 140 of bus 100 regarding which of the primary lines are now faulty, which of the substitute signal lines are now carrying data and which of the substitute signal lines are idle in step S50. In the case that slave modules 200-2 through 200-m contain a microprocessor, the microprocessors of the slave modules are informed by the maintenance signal line 140 on the bus 100 which signal lines carry data, which signal lines are faulty and which signal lines are idle. Then, the microprocessors of each slave module inform the bus signal selectors 310 of the slave modules which signal lines now carry data to enable the bus signal transmitters 330 in the slave modules to send and receive data off the bus 100. In the case that the slave modules are absent a microprocessor, information regarding which signal lines carry data, which signal lines are faulty and which signal lines are idle is fed directly from maintenance signal line 140 to bus signal selector 310 in each of the slave modules in step S50. In step S60, the bus signal selector 310 in each module 200-1 through 200-m connect only signal lines now carrying data on bus 100 to bus signal transmitter 330 to enable the module to send and receive data off bus 100 despite the fact that one or more signal lines on bus 100 may be faulty.

The above described operations can occur during initialization of the data bus system and during operation of the data bus system. The data bus system according to the principles of the present invention enables modules to send data to one another despite the fact that one or more signal lines on the data bus may be inoperable. This is achieved with minimal extra circuitry thereby reducing complexity, manufacturing costs and the presence of redundant circuits. Furthermore, the present invention enables data transmission over a bus even if there are many inoperable signal lines, making the above design and process resilient.

It is to be appreciated that the present invention is not limited to just replacing faulty primary signal lines. It is to be understood that the present invention can be used to compensate for faulty supplementary signal lines as well. Also, the present invention can be applied to other systems such as a motherboard in a personnel computer, etc.

The data bus system in an ATM cell of the present invention comprises a single data bus only. However, the single data bus is enough for the data bus system to operate normally by substituting a supplementary signal line for a malfunctioning signal line when a signal line on the bus is found to be faulty. Sequentially, efficiency of the data bus can be improved. Also, the data bus system of the present invention can be miniaturized, provide lower production cost and provide a higher reliability.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus, comprising:
    a data bus comprising:
        a plurality of primary signal lines exclusively used to transmit data between modules connected to said bus in the absence of an inoperable signal line;
        an extra supplemental signal line that remains idle in the absence of an inoperable primary signal line; and
        a maintenance signal line used to communicate the presence or absence of an inoperable primary signal line and the implementation of the substitute signal line to carry data to each of said plurality of modules, one of said plurality of modules comprises:
        a bus signal monitor testing for inoperable primary signal lines on said bus; and
        a microprocessor communicating results of said test and whether said supplemental signal line has been implemented to carry data to each of said plurality of modules via said maintenance signal line, each module comprises a bus signal selector connecting a bus signal transmitter to the appropriate operable, activated signal lines that carry data based on signals received from said maintenance signal line enabling normal data transfer over said bus between ones of said plurality of modules despite a presence of an inoperable primary signal line.

2. The apparatus of claim 1, said apparatus having only one data bus connecting each one of said plurality of modules.

3. The apparatus of claim 1, said bus comprising a plurality of extra supplemental signal lines to be substituted for a corresponding plurality of inoperable primary signal lines enabling normal data transfer over said bus.

4. The apparatus of claim 1, a number of signal lines on said bus that transmit data between ones of said plurality of modules absent an inoperable signal line is the same as a number of signal lines on said bus that transmit data between ones of said plurality of modules in the presence of an inoperable signal line.

5. An apparatus, comprising only one data bus connecting a plurality of modules, said data bus comprising a plurality of primary signal lines and a supplementary signal line, said supplemental signal line being used as a substitute signal line to carry data on said data bus for an inoperable primary signal line only in the presence of an inoperable primary signal line, each of said plurality of modules comprising only one bus interface unit, each bus interface unit being connected to each of said plurality of primary signal lines as well as the supplementary signal line.

6. The apparatus of claim 5, one of said plurality of modules having a bus monitor testing and detecting a presence of an inoperable primary signal line.

7. The apparatus of claim 5, a number of signal lines on said bus that transmit data between ones of said plurality of modules absent an inoperable signal line is the same as a number of signal lines on said bus that transmit data between ones of said plurality of modules in the presence of an inoperable signal line.

8. The apparatus of claim 5, each bus interface unit comprises only one bus signal transmitter, each bus signal transmitter being adapted to send and receive data from each of the plurality of primary signal lines as well as the supplementary signal line when one of the plurality of primary signal lines is inoperable.

9. An apparatus, comprising only one data bus connecting a plurality of modules, said data bus comprising a plurality of primary signal lines and a supplementary signal line, said supplemental signal line being used as a substitute signal line to carry data on said data bus for an inoperable primary signal line only in the presence of an inoperable primary signal line, one of said plurality of modules having a bus monitor testing and detecting a presence of an inoperable primary signal line, said one of said plurality of modules further comprising a microprocessor connected to said bus monitor, said microprocessor identifying an inoperable primary signal line if detected and acknowledging that said supplemental signal line is serving as a substitute for said inoperable primary signal line to carry data on said bus when an inoperable primary signal line is detected.

10. The apparatus of claim 9, said bus further comprising a maintenance signal line informing each of said plurality of modules of said substitution when an inoperable primary signal line is detected.

11. The apparatus of claim 10, each of said plurality of modules further comprising a bus signal line selector selectively connecting only to operable signal lines that presently are used to carry data on said bus based on information received from said maintenance signal line.

12. The apparatus of claim 11, only one of said plurality of modules comprise a microprocessor.

13. The method of compensating for inoperable signal lines on a data bus connected to a plurality of modules, said method comprising the steps of:
    testing each signal line on said data bus to determine a presence of an inoperable signal line;
    detecting the presence or absence of an inoperable signal line based on said testing step;
    selecting a signal line from a set of extra signal lines on said bus to serve as a substitute signal line for an inoperable signal line to carry data upon detection of said inoperable signal line;
    communicating to each of said plurality of modules an identity of said inoperable signal line and an identity of said selected extra signal line; and
    resuming data communication as normal between each of said plurality of modules over said bus using said selected extra signal line.

14. The method of claim 13, said communicating step comprising placing information comprised of the identity of said inoperable signal line and an identity of said selected extra signal line on a maintenance signal line of said bus to inform each module of the substitution of signal lines used to carry data.

15. The method of claim 13, said testing step occurring at initialization of said bus and said plurality of modules.

16. The method of claim 13, said testing step occurring at regular time intervals during the operation of said bus and said plurality of modules.

17. The method of claim 13, said bus and said plurality of modules being part of an ATM cell.

18. The method of claim 13, a number of signal lines on said bus that transmit data between ones of said plurality of modules absent an inoperable signal line is the same as a number of signal lines on said bus that transmit data between ones of said plurality of modules in the presence of an inoperable signal line.

19. The method of claim 13, said data bus comprising a plurality of primary signal lines carrying data, a plurality of supplemental signal lines carrying data in the event that one or more of the primary signal lines are malfunctioning and a maintenance signal line communicating to each of said plurality of modules which primary signal lines are faulty and which supplemental signal lines are being used to carry data in place of said faulty primary signal lines, each of said plurality of modules comprising a signal selector selecting which signal lines on said bus are currently being used to carry data, a bus signal transmitter transmitting data to said data bus and receiving data from said data bus, one of said plurality of modules comprising a bus monitor testing and detecting faulty signal lines on said bus and a microprocessor selecting supplementary signal lines to carry data on said bus in the event that one or more primary signal lines are detected to be faulty and cannot carry data said microprocessor connected to and supplying information regarding the detection and the substitution of signal lines to the maintenance signal line to inform signal selectors in other modules.

20. An apparatus, comprising:
    a data bus having a set of primary signal lines carrying data and a set of extra signal lines that remain idle in the absence of faulty signal lines;
    a plurality of modules connected to said data bus sending and receiving data over said data bus between ones of said plurality of modules;
    a bus monitor detecting a presence of faulty signal lines on said bus;
    a microprocessor selecting substitute signal lines for carrying data from said extra set of signal lines upon detection of a presence of faulty primary signal lines; and
    a communication line informing each of said plurality of modules of a presence of faulty signal lines and of a selection of substitute signal lines, wherein each module comprises a signal selector connected to said communication line, said signal selector connecting only signal lines that are presently being used to carry data to a bus signal transmitter used to send and receive data over said bus.

21. The apparatus of claim 20, said communication line being a special maintenance signal line on said bus.

22. The apparatus of claim 20, said bus monitor and said microprocessor being disposed within one of said plurality of said modules connected to said bus.

23. The method of claim 20, said data bus comprising a plurality of primary signal lines carrying data, a plurality of supplemental signal lines carrying data in the event that one or more of the primary signal lines are malfunctioning and a maintenance signal line communicating to each of said plurality of modules which primary signal lines are faulty and which supplemental signal lines are being used to carry data in place of said faulty primary signal lines, each of said plurality of modules comprising a signal selector selecting which signal lines on said bus are currently being used to carry data, a bus signal transmitter transmitting data to said data bus and receiving data from said data bus, one of said plurality of modules comprising a bus monitor testing and detecting faulty signal lines on said bus and a microprocessor selecting supplementary signal lines to carry data on said bus in the event that one or more primary signal lines are detected to be faulty and cannot carry data said microprocessor connected to and supplying information regarding the detection and the substitution of signal lines to the maintenance signal line to inform signal selectors in other modules.

24. An apparatus, comprising:
a data bus having a plurality of primary signal lines adapted to carry data and at least one extra signal line adapted to also carry data when at least one of the primary signal lines is faulty; and
a plurality of modules connected to said data bus, each module comprises only one signal selector and only one bus signal transmitter, each signal selector being arranged between the data bus and a corresponding bus signal transmitter, each bus signal transmitter being adatped to send and receive data from both the primary signal lines and the at least one extra signal line when at least one of said primary signal lines is faulty.

25. The apparatus of claim 24, each signal selector being adapted to connect only ones of said plurality of primary signal lines and ones of said at least one estra signal line to said bus signal transmitter that are carrying data and are not faulty.

* * * * *